United States Patent
Kamiyama et al.

(10) Patent No.: US 8,445,151 B2
(45) Date of Patent: May 21, 2013

(54) FUEL CELL SYSTEM AND METHOD FOR CONTROLLING THE SAME

(75) Inventors: Tomohisa Kamiyama, Saitama (JP); Nobutaka Nakajima, Saitama (JP); Tomoyuki Yamashiro, Saitama (JP); Koichiro Miyata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 288 days.

(21) Appl. No.: 12/706,390

(22) Filed: Feb. 16, 2010

(65) Prior Publication Data

US 2010/0209793 A1    Aug. 19, 2010

(30) Foreign Application Priority Data

Feb. 17, 2009    (JP) .................................. 2009-033746

(51) Int. Cl.
H01M 8/04    (2006.01)
(52) U.S. Cl.
USPC ........................................................ 429/429
(58) Field of Classification Search
USPC ........................................................ 429/429
See application file for complete search history.

(56) References Cited

U.S. PATENT DOCUMENTS

2008/0280174 A1    11/2008    Ogawa et al.

FOREIGN PATENT DOCUMENTS

| EP | 1589600 A2 | 10/2005 |
|---|---|---|
| JP | 2003-317766 | 11/2003 |
| JP | 2003-317770 | 11/2003 |
| JP | 2003-331888 A | 11/2003 |
| JP | 2006-19192 | 1/2006 |
| JP | 2008-77901 | 4/2008 |
| JP | 2008-257984 | 10/2008 |

OTHER PUBLICATIONS

European Search Report for Application No. 10153656.3-2119, dated Jun. 1, 2010.
Japanese Office Action for Application No. 2009-033746, dated Apr. 26, 2011.

*Primary Examiner* — Ula C Ruddock
*Assistant Examiner* — Frank Chernow
(74) *Attorney, Agent, or Firm* — Nelson Mullins Riley & Scarborough LLP; Anthony A. Laurentano

(57) ABSTRACT

A fuel cell system includes a replacing unit for replacing a gas remaining in the anode of the fuel cell with the anode gas supplied anew by the anode gas supply unit when starting up the fuel cell. The amount of the anode gas is set to be lower, if the operation condition determining unit determines that the last operation was performed in a low-temperature and short-time operation mode. The operation condition determining unit sets the amount of the anode gas so that the gas remaining in the anode can be replaced with the anode gas with an entire anode capacity if the anode was been scavenged while no electro-chemical reaction was progressing in the fuel cell. The present invention can set the amount of anode gas appropriately when starting up the fuel cell.

4 Claims, 6 Drawing Sheets

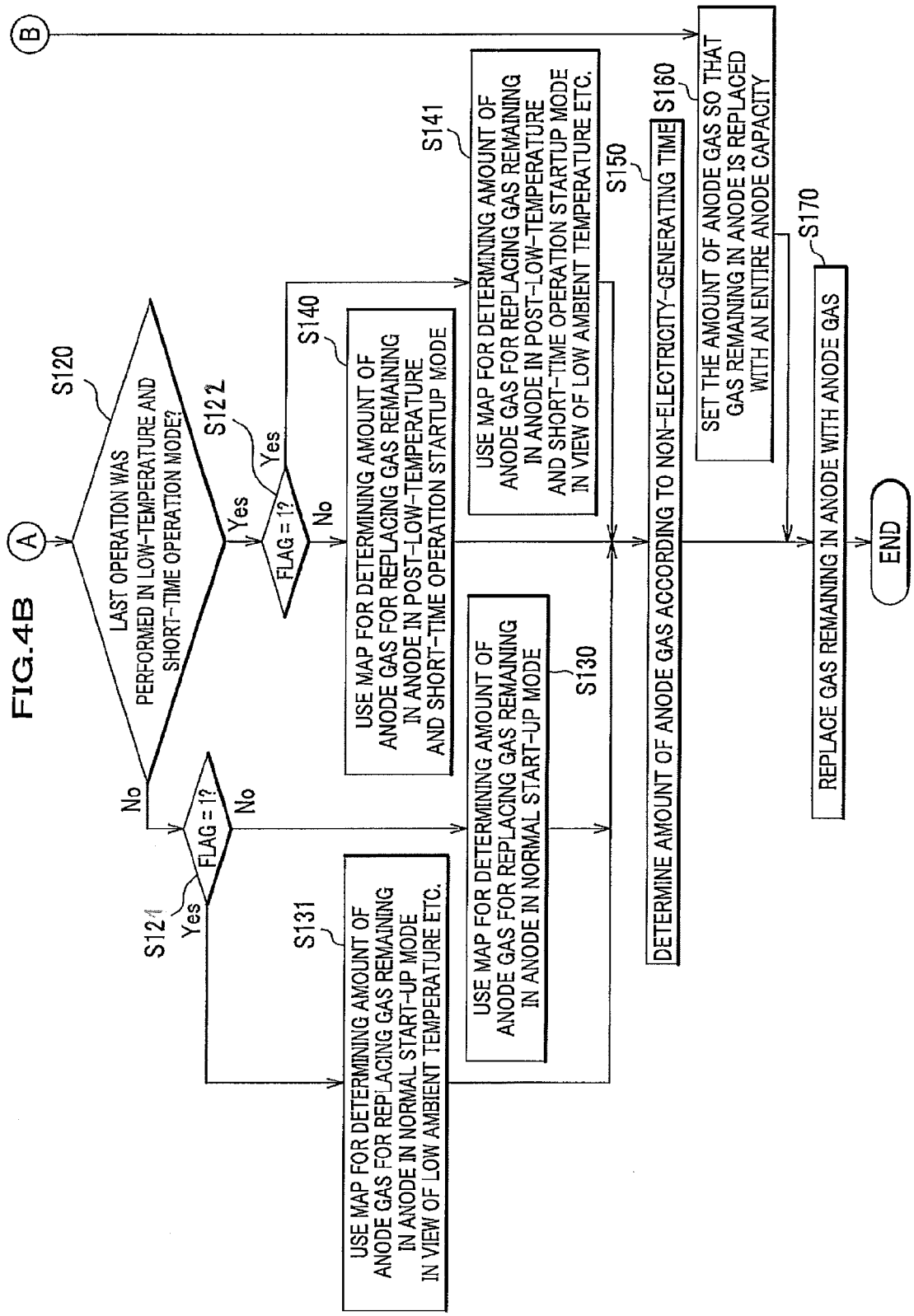

FUEL CELL SYSTEM AND METHOD FOR CONTROLLING THE SAME

CROSS REFERENCE TO RELATED APPLICATIONS

This application claims the foreign priority benefit under Title 35, United States Code, §119 (a)-(d), of Japanese Patent Application No. 2009-033746, filed on Feb. 17, 2009, in the Japan Patent Office, the disclosure of which is herein incorporated by reference in its entirety.

BACKGROUND OF THE INVENTION

1. Field of the Invention

The present invention relates to a fuel cell system and method for controlling the same for starting up the fuel cell system appropriately in accordance with various conditions of the fuel cell.

2. Description of the Related Art

In some cases, a solid polymer electrolyte membrane fuel cell has a problem with cross leak, which is a phenomenon in which a fuel (anode gas) permeates from anode to a cathode through an electrolyte membrane, and an oxidant (cathode gas) permeates from the cathode to the anode through the electrolyte membrane while no electric power is being generated from the fuel cell. As widely known, if this phenomenon occurs, the amount of fuel remaining inside the anode decreases; and therefore, the concentration of the fuel inside the anode decreases accordingly. As a countermeasure for this phenomenon, a gas remaining inside the anode of a fuel cell is replaced with anode gas when starting up the fuel cell. (See, for example, Japanese Patent Laid-open Publication No. 2003-331888, paragraphs [0015] to [0018] and FIG. 1.)

The inventors of the present invention found that the amount of anode gas remaining inside the anode of a fuel cell is not constant when starting up the fuel cell; that is, the amount of anode gas remaining inside the anode of the fuel cell varies according to ambient temperature or according to a fuel cell operation when stopping electric power from being generated in the fuel cell. More specifically, if the concentration of the anode gas is high inside the anode, a fewer amount of anode gas may be supplied anew for replacing a scavenging gas remaining inside the anode when starting up the fuel cell. Conversely, if the concentration of the anode gas is low inside the anode, a greater amount of anode gas must be supplied anew for replacing a scavenging gas remaining inside the anode when starting up the fuel cell. However, no method has been considered for adjusting the amount of anode gas according to the concentration of the anode gas remaining inside the anode.

SUMMARY OF THE INVENTION

The present invention was conceived in view of the aforementioned circumstances. An object of the present invention is to provide a fuel cell system which is capable of setting the amount of anode gas for replacing a scavenging gas remaining in the anode of a fuel cell appropriately. Also, an object of the present invention is to provide a method for controlling the fuel cell system.

A first aspect of the present invention provides a fuel cell system including: a fuel cell having an anode and a cathode and producing electric power, an anode gas being supplied to the anode, a cathode gas being supplied to the cathode; an anode gas supply unit for supplying the anode gas to the anode of the fuel cell; an operation condition determining unit for determining whether a last operation of the fuel cell system is performed in a low-temperature and short-time operation mode when receiving a start-up request signal which requests to start up the fuel cell; and a replacing unit for replacing a gas remaining in the anode of the fuel cell with the anode gas supplied directly by the anode gas supply unit when starting up the fuel cell, wherein if the operation condition determining unit determines that the last operation is performed in the low-temperature and short-time operation mode, the operation condition determining unit sets an amount of the anode gas, which is to replace the gas remaining in the anode of the fuel cell, to be lower than an amount of the anode gas, which is to replace the gas remaining in the anode of the fuel cell if the last operation is not performed in the low-temperature and short-time operation mode.

In addition, a second aspect of the present invention provides a method for controlling a fuel cell system, the fuel cell system including: a fuel cell for producing electric power, the fuel cell having an anode and a cathode, an anode gas being supplied to the anode, a cathode gas being supplied to the cathode; an anode gas supply unit for supplying the anode gas to the anode of the fuel cell; an operation condition determining unit for determining whether a last operation of the fuel cell system is performed in a low-temperature and short-time operation mode when receiving a start-up request signal which requests to start up the fuel cell; and a replacing unit for replacing a gas remaining in the anode of the fuel cell with the anode gas supplied directly by the anode gas supply unit when starting up the fuel cell, the method including the steps, performed by the operation condition determining unit, of: determining whether the last operation of the fuel cell system was performed in the low-temperature and short-time operation mode when receiving the start-up request signal which requests to start up the fuel cell; and setting an amount of the anode gas, which is to replace the gas remaining in the anode of the fuel cell, according to whether the operation condition determining unit determines that the last operation is performed in the low-temperature and short-time operation mode, the amount of the anode gas being set to be lower, if the operation condition determining unit determines that the last operation is performed in the low-temperature and short-time operation mode, than an amount of the anode gas, which is to replace the gas remaining in the anode of the fuel cell, if the last operation is not performed in the low-temperature and short-time operation mode.

According to these aspects of the present invention, the amount of water produced inside the fuel cell is low, and the electrolyte membrane is at a low temperature and in a dry condition if the last operation of the fuel cell system is performed in the low-temperature and short-time operation mode.

the low-temperature and short-time operation mode is defined as a mode in which, an ignition switch is turned on; the operation condition determining unit checks whether an open circuit voltage (OCV) of the fuel cell reaches a predetermined voltage while an electro-chemical reaction is started, whether the ignition switch is turned off before the temperature in the fuel cell reaches a predetermined warmed-up condition temperature, and whether electro-chemical reaction is stopped from progressing in the fuel cell. The predetermined warmed-up condition temperature differs according to the types of the like of the electrolyte membrane. The predetermined warmed-up condition temperature is defined as a temperature at which the water starts permeating from the cathode to the anode of the fuel cell, i.e., the temperature at which the generation of electricity starts being stable (e.g. 30 to 60° C.). Therefore, the electrolyte membrane is at a low temperature and in dry condition if the temperature in the fuel cell is equal to or lower than the predetermined warmed-up condition temperature, and the electrolyte membrane is at a normal temperature and in humid condition if the temperature in the fuel cell exceeds the predetermined warmed-up condition temperature.

If the electrolyte membrane is at a low temperature and in a dry condition, the amount of cross leak between the anode and the cathode tends to decrease relative to the electrolyte membrane being at a normal temperature and in a humid condition. That is, the rate of anode gas decreasing in the anode is lower; therefore, the fuel cell system needs a lower amount of anode gas for replacing a gas remaining in the anode when starting the fuel cell system. If the last operation was performed in the low-temperature and short-time operation mode, the fuel cell system can decrease the consumption amount of anode gas for replacing a gas remaining in the anode when starting the fuel cell system when starting the fuel cell. Therefore, fuel efficiency increases. In addition, the time for replacing the gas remaining in the anode can be shortened since the consumption amount of the fuel is reduced; therefore, the time for starting up the fuel cell can also be shortened.

In a third aspect of the present invention, the fuel cell system further includes a non-electricity-generating-time measurement unit for measuring a time period during which no electric power is being generated from the fuel cell, wherein the operation condition determining unit sets the amount of the anode gas, which is to replace the gas remaining in the anode of the fuel cell, to be greater if the non-electricity-generating time measured by the non-electricity-generating-time measurement unit is longer.

In general, the concentration of anode gas remaining in the anode decreases by cross leak if the time for stopping the electricity from being generated in the fuel cell is longer. However, according to this feature, the present invention can set the necessary amount of replacing gas by setting it according to the time for stopping the electricity from being generated in the fuel cell.

In a fourth aspect of the present invention, the fuel cell system further includes an anode-scavenging unit for scavenging the anode while no electricity is generated from the fuel cell, wherein the operation condition determining unit sets the amount of the anode gas so that the gas remaining in the anode is replaced with the anode gas with an entire anode capacity if the anode was scavenged by performing the anode-scavenging operation.

If the anode-scavenging operation is performed for scavenging the anode with a scavenging gas when the electricity is stopped from being generated in the fuel cell, the inside anode is completely replaced, i.e. filled with the scavenging gas (e.g. a cathode gas). Therefore, the gas remaining in the anode must be replaced by the anode gas completely when starting up the fuel cell. So, even if the anode is scavenged, the fuel cell system of the present invention can set the necessary amount of anode gas for replacing the gas remaining in the anode and obtain a superior start-up capability since the scavenging gas remaining in the anode is replaced with the anode gas with an entire anode capacity.

In a fifth aspect of the present invention, the fuel cell system further includes a generated-electricity calculation unit for calculating an amount of electricity generated from the fuel cell operated in the low-temperature and short-time operation mode, wherein the operation condition determining unit sets the amount of the anode gas, which is to replace the gas remaining in the anode of the fuel cell, to be lower if the generated electricity calculated by the generated-electricity calculation unit is lower.

In general, the concentration of anode gas remaining in the anode decreases to a fewer degree by cross leak if the time for stopping the electricity from being generated in the fuel cell is longer in the low-temperature and short-time operation mode since the electrolyte membrane is at a low temperature and in a dry condition if the electricity generated in the low-temperature and short-time operation mode is lower. The present invention can improve the fuel efficiency and shorten the time for starting up the fuel cell by decreasing the amount of anode gas for replacing the gas remaining in the anode if the amount of electricity generated in the low-temperature and short-time operation mode is lower.

The present invention can provide a fuel cell system which is capable of setting the necessary amount of anode gas for replacing a scavenging gas remaining in the anode of a fuel cell. The present invention can also provide a method for starting up the fuel cell system.

BRIEF DESCRIPTION OF THE DRAWINGS

FIGS. 4A and 4B, in combination, show a flowchart showing another process of starting up the fuel cell system according to another embodiment of the present invention.

DETAILED DESCRIPTION OF THE INVENTION

One embodiment of the present invention will be explained with reference to FIGS. 1 to 3 as follows. Although the embodiment explained herein relates to fuel cell vehicles (not shown in the accompanying drawings), the present invention is not limited to fuel cells used in vehicles. The present invention can also be applied to any other type of fuel cell used for ocean vessels, aircrafts, and consumer-or-business use stationary fuel cell systems.

Figure 1:
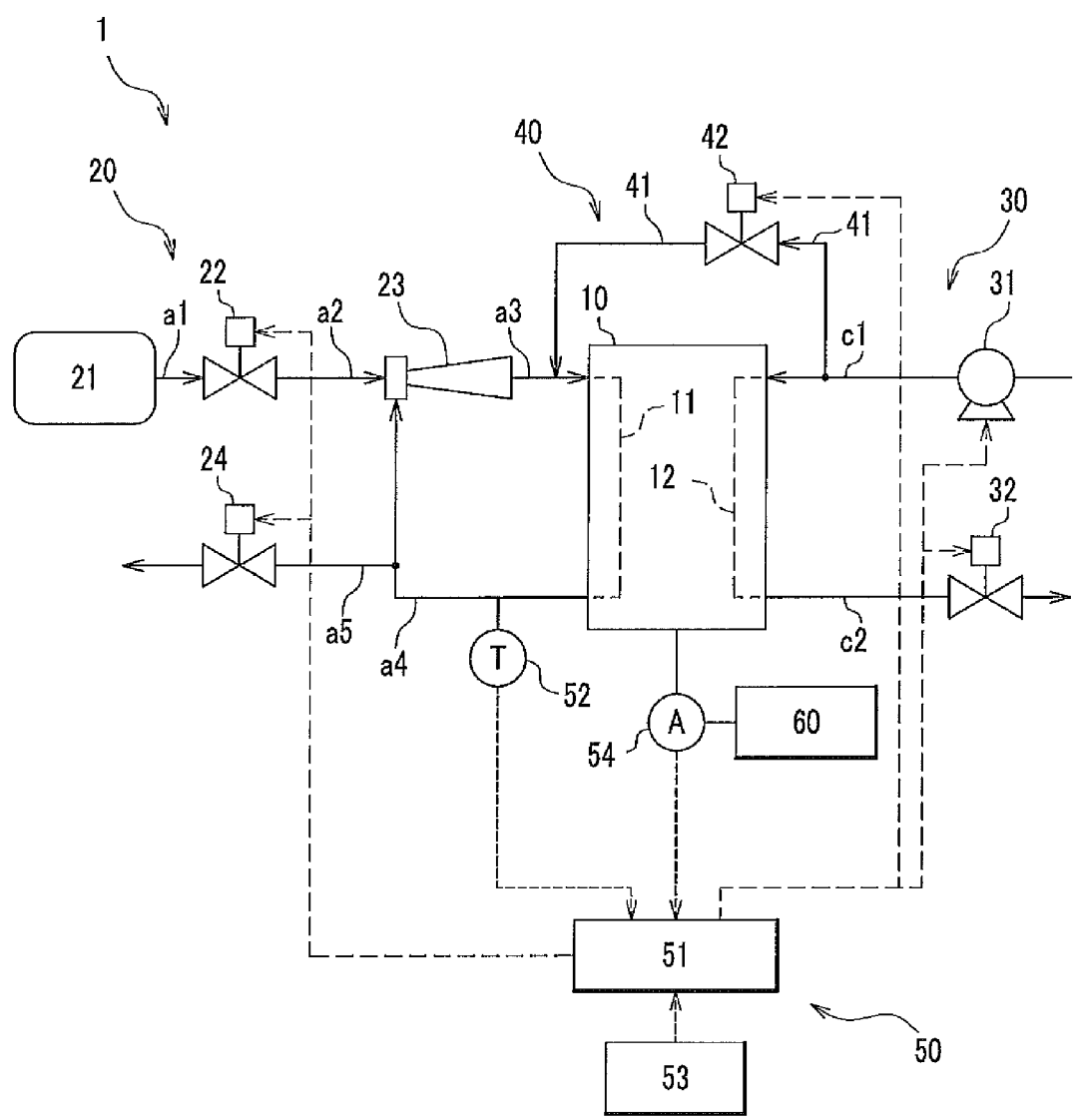
FIG. 1 is a schematic diagram of a fuel cell system according to an embodiment of the present invention.
Figure 2:
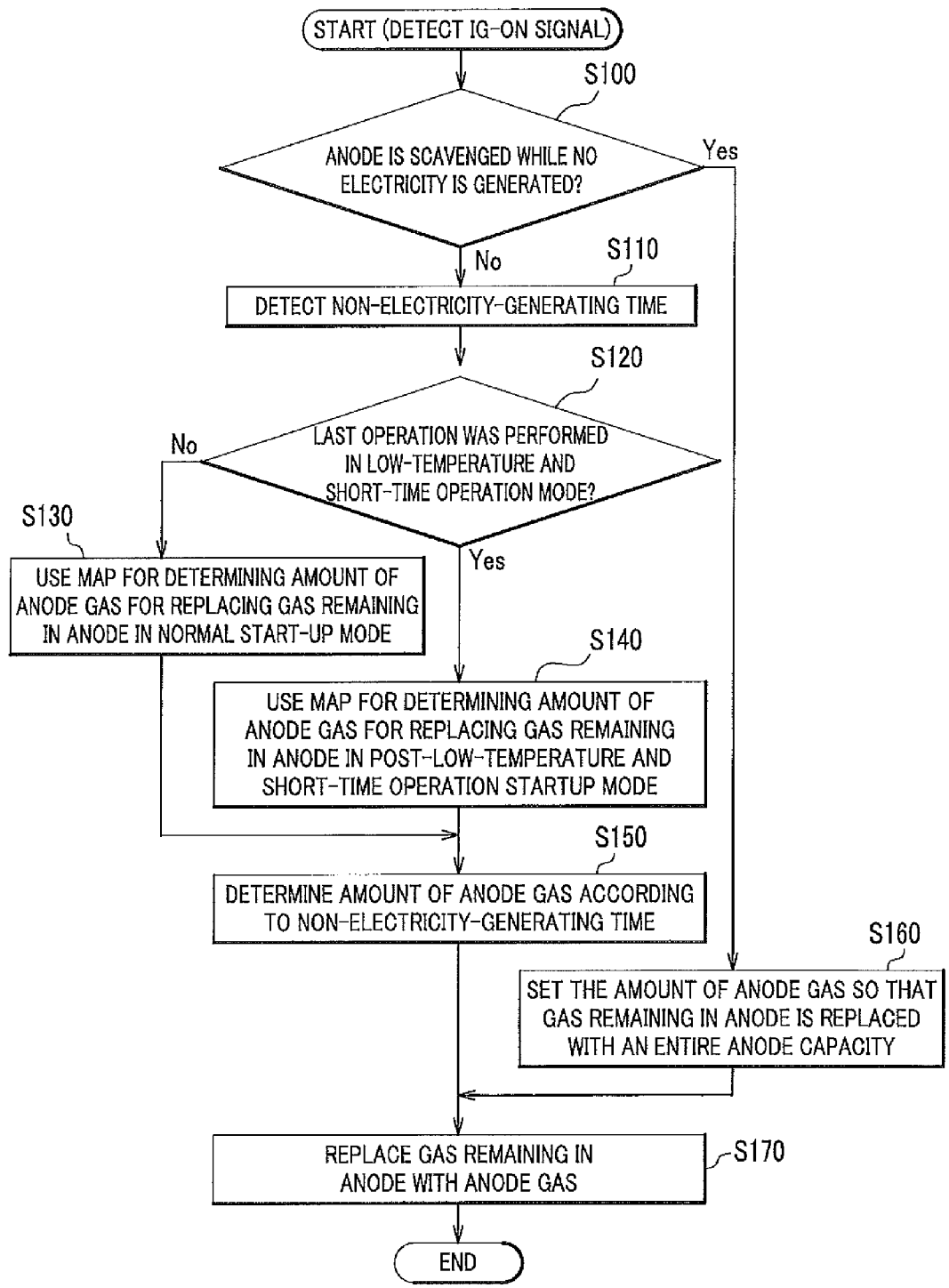
FIG. 2 is a flowchart showing a process of starting up the fuel cell system according to an embodiment of the present invention.

As shown in FIG. 1, a fuel cell system 1 according to the present embodiment includes: a fuel cell 10; an anode system 20; a cathode system 30; a scavenging system 40; and a control system 50.

The fuel cell 10 is a proton exchange membrane (PEM) fuel cell which includes a plurality of stacked single cells each having a membrane electrode assembly (MEA) placed between a pair of conductive separators. The MEA includes a cathode; an anode; and a solid polymer electrolyte membrane disposed between the anode and the cathode, both of which include catalysts. On one surface of each separator facing the anode, an anode flowpath 11 is formed for flowing hydrogen (anode gas) therethrough. On the other surface of each separator facing the cathode, a cathode flowpath 12 is formed for flowing air (cathode gas) therethrough. Although not shown in the drawing, each separator has a refrigerant flowpath therein for flowing a refrigerant for cooling the fuel cell 10.

The anode system 14 supplies hydrogen (anode gas) to the anode of the fuel cell 10 and also discharges anode off-gas from the anode. The anode system 14 includes: a hydrogen tank 21, a shut-off valve 22, an ejector 23, a purge valve 24, and pipes a1 to a5.

In the hydrogen tank 28, highly pressurized and very pure hydrogen is stored. The hydrogen tank 21 is connected with an inlet of the anode flowpath 11 formed in the fuel cell 10, through the pipe a1, the shut-off valve 22, the pipe a2, the ejector 23, and the pipe a3 connected with each other in this order. It should be noted that the shut-off valve 22 is an electro-magnetic component.

The ejector 23 creates a negative pressure to suck hydrogen which is unused for electro-chemical reaction and is discharged from an outlet of the anode flowpath 11 through the pipe a4. The ejector 23 mixes the sucked hydrogen with hydrogen supplied anew by the hydrogen tank 21 to circulate again, and supplies the mixture to the anode.

The purge valve 24 is, for example, an electro-magnetic component. The purge valve 24 is connected with the pipe a4 through the pipe a5. When starting up the fuel cell 10, the purge valve 24 discharges gas (air etc.) remaining inside the anode to the outside through the pipes a4 and a5. Also, while electro-chemical reaction is under way in the fuel cell 10, the purge valve 24 is opened, for example, periodically to discharge impurities remaining in the anode. It should be noted that the impurities are: nitrogen introduced from outside and permeated from the cathode to the anode through the electrolyte membrane; and water etc. produced in the anode.

The cathode system 30 supplies air (cathode gas) to the cathode of the fuel cell 10 and discharges cathode off-gas (humid air etc.) from the cathode. The cathode system 30 may include an air compressor 31, a back-pressure-regulating valve 32, and pipes c1 and c2, etc.

The air compressor 31 may be a mechanical supercharger driven by, for example, a motor. The air compressor 31 is connected with the inlet of the cathode flowpath 12 through the pipe c1. The air compressor 31 has functions of introducing air from outside; compressing the introduced air; and feeding the compressed air to the fuel cell 10.

The back-pressure-regulating valve 32 may be a butterfly valve etc. whose opening is variable. The back-pressure-regulating valve 32 is connected with the outlet of the cathode flowpath 12 through the pipe c2. The back-pressure-regulating valve 32 has a function of regulating the pressure of air (internal pressure of the cathode) to be supplied to the cathode.

It should be noted that the cathode system 30 may include a humidifier or the like, not shown in the accompanying drawings, for humidifying the air introduced from outside by the air compressor 31.

The scavenging system 40 supplies the air (cathode gas, scavenging gas, and the likes) introduced by the air compressor 31 to the anode while the electro-chemical reaction is kept from progressing in the fuel cell 10. The scavenging system 40 includes a scavenging gas introduction flowpath 41 and a scavenging gas introduction valve 42 etc.

The scavenging gas introduction flowpath 41 has an upstream end and a downstream end. The upstream end is connected with an upstream from a humidifier (not shown in the accompanying drawings) connected with the pipe c1. The downstream end is connected with the pipe a3. The scavenging gas introduction valve 42 connected with the scavenging gas introduction flowpath 41 is, for example, an electro-magnetic valve. The scavenging gas introduction valve 42 is controlled by a control unit 51 to open for scavenging the anode while the electro-chemical reaction is kept from progressing in the fuel cell 10.

It should be noted that, in the present embodiment, the scavenging gas introduction flowpath 41, the scavenging gas introduction valve 42, the air compressor 31, and the control unit 51 constitute an anode-scavenging unit.

The control system 50 includes the control section 51, a temperature sensor 52, a timer 53, and an ammeter 54 etc.

The control unit 51 includes a central processing unit (CPU); a random access memory (RAM); a read-only memory (ROM) storing programs; and the likes. The control unit 51 is connected with the shut-off valve 22, the purge valve 24, the air compressor 31, the back-pressure-regulating valve 32, and the scavenging gas introduction valve 42 respectively. The control unit 51 opens and closes the shut-off valve 22, the purge valve 24, and the scavenging gas introduction valve 42. The control unit 51 controls the rotational speed of the motor of the air compressor 31, and regulates the opening degree of back-pressure-regulating valve 32.

The control unit 51 and the purge valve 24 function as a replacing unit. To be more specific, when the control unit 51 opens the purge valve 24 for starting up the fuel cell 10a, the gas remaining in the anode of the fuel cell 10 is replaced with hydrogen supplied from the hydrogen tank 21.

The temperature sensor 52 detects a temperature in the fuel cell 10. The temperature sensor 52 is fixed on the pipe a4 which is connected with the outlet of the anode flowpath 11. The temperature in the fuel cell 10 detected by the temperature sensor 52 is used for determining whether to perform an anode-scavenging operation while electro-chemical reaction is kept from progressing in the fuel cell 10. The temperature in the fuel cell 10 detected by the temperature sensor 52 is also used for determining whether to start up the fuel cell 10 in a low-temperature start-up mode.

It should be noted that the position of the temperature sensor 52 is not limited to that in the present embodiment, and that the temperature sensor 52 can be attached anywhere in the circuit of the fuel cell system 1 as long as the temperature sensor 52 can detect the temperature in the fuel cell 10. For example, the temperature sensor 52 can be fixed on the pipe c2 which is connected with the outlet of the cathode flowpath 12. Alternatively, although not shown in the accompanying drawings, the temperature sensor 52 may detect the temperature of a refrigerant being circulated through the fuel cell 10, or detect the temperature in the fuel cell 10 directly.

The timer 53 measures a time period for which no electric power is being generated from the fuel cell 10. In the present specification, this time period is hereinafter called "non-electricity-generating time". The timer 53 functions as a non-electricity-generating-time measurement unit.

The non-electricity-generating time of the fuel cell 10 is a time period beginning when a driver turns off an ignition switch of a fuel cell vehicle and ending when the driver turns on the ignition switch. It should be noted that the timer 53 (non-electricity-generating-time measurement unit in the present invention) measures a driving time for which the fuel cell 10 is driven in a low-temperature and short-time mode. Hereinafter, the operation of the fuel cell 10 in this state is called a low-temperature and short-time operation mode. In the present specification, the driving time period is defined as a time period beginning when the driver turns on the ignition switch and ending when the driver turns off the ignition switch. Also, the low-temperature and short-time operation mode is defined as a mode in which, the ignition switch is turned on; the control unit 51 checks whether an open circuit voltage (OCV) of the fuel cell 10 reaches a predetermined voltage while an electro-chemical reaction is started, whether the ignition switch is turned off before the temperature in the fuel cell 10 reaches a predetermined warmed-up condition temperature (e.g. 30° C.), and whether electro-chemical reaction is stopped from progressing in the fuel cell 10.

If the temperature in the fuel cell 10 is equal to or lower than the predetermined temperature, the electrolyte membrane is at a low temperature and in a dry condition since the power generating capability of the fuel cell 10 in this state is low; therefore, a fewer amount of water is produced. If the temperature in the fuel cell 10 exceeds the predetermined temperature, water begins to permeate to the anode through the electrolyte membrane; therefore, the electrolyte membrane is at a normal temperature and in a humid condition.

The ammeter 54, which is necessary for measuring the power output generated by the fuel cell 10, measures the electric current. More specifically, the ammeter 54 measures a value of electric current flowing through an external load 60 into which electrons separated from protons in the fuel cell 10 flows. It should be noted that, in the present invention, the external load 60 is a motor (not shown in the accompanying drawings) for travelling the vehicle, a battery (not shown in the accompanying drawings) for storing the generated power, the air compressor 31, or the likes. The electric current measured by the ammeter 54 is added up by the control unit 51. The control unit 51 can measure the quantity of the power output generated by the fuel cell 10 according to the added-up electric current.

Based on generated electricity that is measured, the amount of water produced in the fuel cell 10 is estimated. More specifically, the control unit 51 estimates whether the electrolyte membrane is at a low temperature and in a dry condition, or the electrolyte membrane is at a normal temperature and in a humid condition. If the amount of the measured generated electricity is low, a fewer amount of water is produced in the fuel cell 10. Accordingly, the electrolyte membrane is at a low temperature and in a dry condition; and therefore, the amount of hydrogen leaking from the anode to the cathode decreases. It should be noted that, in the present embodiment, the ammeter 54 and the control unit 51 function as a generated electricity calculation unit.

Hereinafter, control operations for starting up the fuel cell system according to the present embodiment will be explained with reference to FIGS. 1 to 3. The control unit 51 determines whether a previous operation of a vehicle (i.e. the fuel cell system 1) was performed in the low-temperature and short-time operation mode. If the last operation of the fuel cell system 1 was performed in the low-temperature and short-time operation mode, the control unit 51 sets a flag etc., which indicates a history of the low-temperature and short-time operation mode, and stores a record such as a flag in an electrically erasable programmable read-only memory (EEPROM) etc.

Also, the control unit 51 determines whether an anode-scavenging operation was performed while no electricity is generated from the fuel cell 10 after the last operation is stopped by turning of the ignition switch. If the control unit 51 determines that the anode is scavenged, the control unit 51 sets a record such as a flag etc., which indicates a history of scavenging the anode, and stores the flag in the EEPROM etc.

In the present specification, the anode-scavenging operation is defined as a process of discharging water produced in the fuel cell 10 by introducing a scavenging gas into the anode for preventing the water remaining in the anode flowpath 11 etc. in the fuel cell 10 from being freezing while no electric power is being generated. That is, while no electric power is being generated, the control unit 51 opens the purge valve 24 and the scavenging gas introduction valve 42 and sets the back-pressure-regulating valve 32 at a necessary opening degree by means of electric power supplied by a battery which is not shown in the accompanying drawings. In this state, when the control unit 51 drives the motor of the air compressor 31 at a predetermined rotational speed, the air (scavenging gas) supplied by the air compressor 31 is supplied to the anode flowpath 11 through the scavenging gas introduction flowpath 41. As a result, the water remaining in the anode flowpath 11 is blown off and discharged to the outside the vehicle through the purge valve 24.

The control unit 51 determines a timing of performing an anode-scavenging operation according to the temperature in the fuel cell 10. For example, the control unit 51 performs an anode-scavenging operation if the detected temperature is equal to or lower than a predetermined temperature (e.g. 5° C.). Therefore, if the control unit 51 determines that the temperature in the fuel cell 10 is equal to or lower than the predetermined temperature, the control unit 51 performs an anode-scavenging operation immediately.

In the present invention, the condition for determining whether to perform an anode-scavenging operation is not limited to the temperature in the fuel cell 10. For example, whether to perform an anode-scavenging operation may be determined based on the ambient temperature, weather information, or the like.

In the present invention, a scavenging operation may be conducted not only on the anode. If both the anode and the cathode are scavenged, the control unit 51 sets a flag etc., which indicates a history of scavenging both the anode and the cathode, and stores the flag in the EEPROM etc. In this case, the anode and the cathode may be scavenged alternately. Alternatively, both the anode and the cathode may be scavenged simultaneously.

When the ignition switch is turned off, the control unit 51 activates the timer 53, by means of electric power supplied by a battery to measure a time period elapsing after turning off the ignition switch. This battery is not shown in the accompanying drawings and provided for accessories operable at low voltage.

When the driver turns on the ignition switch, the control unit 51 detects an IG-ON signal (i.e. a start-up request signal). Then, in step S100 as shown in FIG. 2, the control unit 51 determines whether an anode-scavenging operation was performed while no electricity is generated from the fuel cell 10. As previously explained, the control unit 51 can determine whether an anode-scavenging operation was performed previously since the control unit 51 can refer to the EEPROM for a history of an anode-scavenging operation.

In the step S100, if the control unit 51 determines that neither an anode-scavenging operation nor an scavenging operation for both the anode and the cathode (hereinafter called anode-and-cathode scavenging operation) was performed while no energy is generated from the fuel cell 10, the start-up control operation proceeds to step S110. In the step S100, if the control unit 51 determines that the anode-scavenging operation or the anode-and-cathode scavenging operation was performed while no energy is generated from the fuel cell 10, the start-up control operation proceeds to step S160.

If the control unit 51 determines that neither one of the anode-scavenging operation nor the anode-and-cathode scavenging operation was performed while no electricity is generated from the fuel cell 10, the control unit 51 activates the timer 53 to detect a time period beginning at turning off the ignition switch and ending at turning on the ignition switch.

The start-up control operation proceeds to step S120, and the control unit 51 determines whether the last operation of the fuel cell system 1 was performed in the low-temperature and short-time operation mode. If the control unit 51 determines that the last operation of the fuel cell system 1 was performed not in the low-temperature and short-time operation mode (No at the step S120), the start-up control operation proceeds to step S130. If the control unit 51 determines that the last operation of the fuel cell system 1 was performed in the low-temperature and short-time operation mode (Yes at the step S120), the start-up control operation proceeds to step S140. It should be noted that a process performed by an operation condition determining unit of the present invention is equivalent to the step S120.

Figure 3:
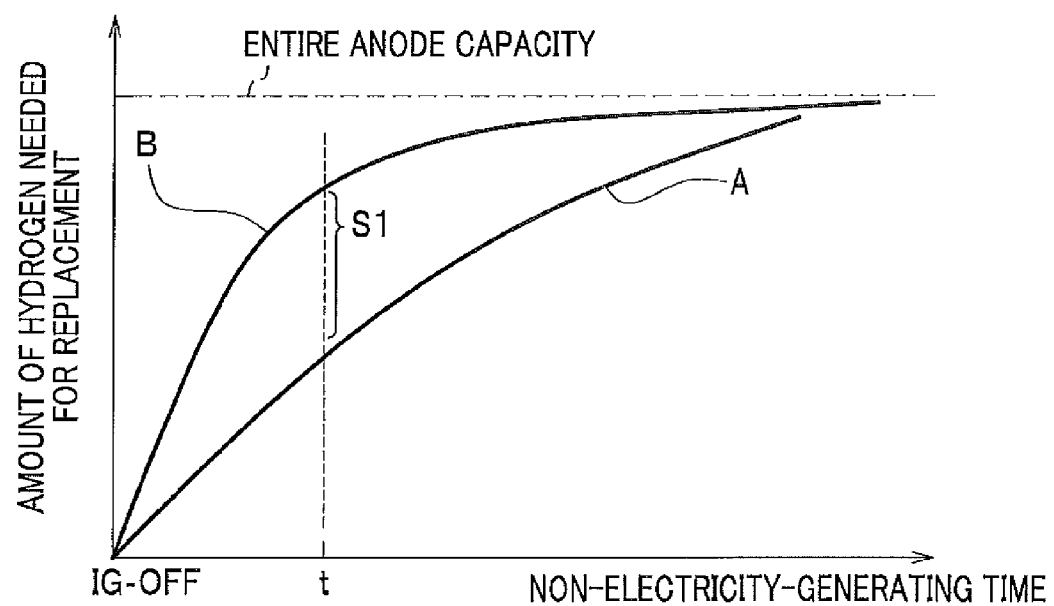
FIG. 3 shows a MAP for determining the amount of anode gas for replacing air and water remaining in the anode.

A solid line B shown in FIG. 3 is a MAP, to be used by the control unit 51 in the step S130, for determining the amount of anode gas (hydrogen) needed for replacing a scavenging gas remaining in the anode (hereinafter called replacing gas amount) when starting up the fuel cell 10 in a normal start-up mode. The normal start-up mode is defined as a mode used for starting up the fuel cell 10 if the last operation was not in the low-temperature and short-time operation mode, i.e., the electrolyte membrane is at a normal temperature and in a humid condition. It should be noted that the MAP indicated by the solid line B is obtained from previously conducted experiments etc.

As indicated by the solid line B in FIG. 3, the replacing gas amount is set to be greater if the non-electricity-generating time becomes longer since the concentration of hydrogen remaining in the anode decreases by cross leak if the non-electricity-generating time becomes longer.

A solid line A shown in FIG. 3 is a MAP, used by the control unit 51 in the step S140, for determining the amount of anode gas (hydrogen) for replacing a scavenging gas remaining in the anode when starting up the fuel cell 10 in a post-low-temperature and short-time operation startup mode. The post-low-temperature and short-time operation startup mode is defined as a mode used for starting up the fuel cell 10 if the last operation was performed in the low-temperature and short-time operation mode, i.e., the electrolyte membrane is at a low temperature and in a dry condition. It should be noted that the MAP indicated by the solid line A is obtained from previously conducted experiments etc.

According to the solid line A shown in FIG. 3, the replacing gas amount is set to be greater if the non-electricity-generating time becomes longer, and is set to be lower than that of the normal start-up mode. In the present invention, the replacing gas amount indicated by the solid line A set for the post-low-temperature and short-time operation startup mode is set to be lower than the replacing gas amount indicated by the solid line B set for the normal start-up mode. One conceivable reason for the lower replacing gas amount is that the rate of hydrogen decreasing in the anode due to cross leak is lower because the electrolyte membrane is at a low temperature and in dry condition if the last operation was performed in the low-temperature and short-time operation mode.

The start-up control operation proceeds to step S150, and in this step, the control unit 51 determines the replacing gas amount according to the non-electricity-generating time detected by the timer 53 and with reference to the solid line A or B shown in FIG. 3. To be more specific, the control unit 51 determines the replacing gas amount according to the MAP indicated by the solid line B shown in FIG. 3 if the control unit 51 adopts the MAP for the normal start-up mode; and the control unit 51 determines the replacing gas amount according to the MAP indicated by the solid line A shown in FIG. 3 if the control unit 51 adopts the MAP for the post-low-temperature and short-time operation startup mode.

It should be noted that data showing the electricity generated from the fuel cell 10 in the low-temperature and short-time operation mode may be obtained previously so that the control unit 51 may reduce the replacing gas amount according to the electricity generated from the fuel cell 10 in the low-temperature and short-time operation mode. More specifically, the amount of water produced in the fuel cell 10 is low if the electricity generated by the fuel cell 10 is low; therefore, the electrolyte membrane is at a low temperature and in a dry condition. As a result, the cross leak decreases between the anode and the cathode, and the rate of hydrogen's concentration decreasing in the anode is reduced accordingly.

The start-up control operation proceeds to step S170, and the control unit 51 replaces the scavenging gas remaining in the anode with the anode gas. To be more specific, the control unit 51 opens the purge valve 24 and the shut-off valve 22. In this state, the control unit 51 supplies hydrogen to the anode from the hydrogen tank 21. Also, the control unit 51 drives the air compressor 31 to supply air to the cathode.

By supplying hydrogen to the cathode while the purge valve 24 is kept open, the gas (air or water) remaining in the anode flowpath 11 is replaced with hydrogen gradually; therefore, the concentration of hydrogen increases, and accordingly, the OCV of the fuel cell 10 increases gradually. When the OCV reaches the predetermined voltage, the control unit 51 connects the fuel cell 10 with the external load 60 electrically. Then, an electric control unit (ECU), which is not shown in the accompanying drawings, starts outputting electric power from the fuel cell 10.

In the step S100, the control unit 51 checks the record stored in the EEPROM. If the control unit 51 determines that the anode-scavenging operation or the anode-and-cathode scavenging operation was performed while no electricity is generated kept stopped (Yes at the step S100), the start-up control operation proceeds to step S160. By performing the anode-scavenging operation or the anode-and-cathode scavenging operation, the anode is scavenged completely.

In the step S160, the control unit 51 sets the amount of hydrogen (replacing gas amount) so that the scavenging gas or water etc. remaining in the anode can be replaced with the anode gas with an entire anode capacity. It should be noted that, if the anode-scavenging operation or the anode-and-cathode scavenging operation was performed in the last operation, the control unit 51 sets the constant replacing gas amount as explained above regardless of the non-electricity-generating time. The replacing gas amount set in the step S160 can be obtained by previously conducted experiments etc.

The start-up control operation proceeds to step S170, and the control unit 51 replaces the scavenging gas remaining in the anode with the anode gas with the entire anode capacity, for example, by opening the purge valve 24 for a longer time to supply more fresh hydrogen to the anode from the hydrogen tank 21.

As explained above, the fuel cell system 1 according to the present embodiment can reduce fuel (i.e. hydrogen) consumption and improve fuel efficiency since, if the last operation of the of the fuel cell system 1 was performed in the low-temperature and short-time operation mode, the control unit 51 decreases the replacing gas amount relative to a case in which the last operation was performed in not the low-temperature and short-time operation mode. In addition, the fuel cell system 1 according to the present embodiment can shorten the time for starting up the fuel cell 10 of the fuel cell system 1 (hereinafter called start-up time) since the time necessary for replacing the scavenging gas remaining in the anode can be shortened. In the present specification, the start-up time is defined as a time period which is necessary for the fuel cell system 1 to create power output from the fuel cell 10.

For example, if the non-electricity-generating time of the fuel cell 10 is indicated by a time period t as shown in FIG. 3, the fuel cell system 1 according to the present embodiment can improve fuel efficiency and shorten the start-up time since the control unit 51 can decrease the replacing gas amount (i.e. the amount of hydrogen) by an amount corresponding to a difference S1 from a case in which the fuel cell system 1 is started up always in the normal start-up mode, i.e., regardless of whether the last operation was performed in the low-temperature and short-time operation mode or not.

The fuel cell system 1 according to the present embodiment can set a necessary replacing gas amount by setting the replacing gas amount to be greater if the non-electricity-generating time is longer because the concentration of the hydrogen remaining in the anode becomes lower by cross leak if the non-electricity-generating time of the fuel cell 10 becomes longer (i.e. if the time period, beginning at turning off the ignition switch and ending at turning on the ignition switch, becomes longer).

If hydrogen remaining in the anode after turning off the ignition switch is replaced by air (scavenging gas) completely by performing the anode-scavenging operation or the anode-and-cathode scavenging operation, i.e. if the concentration of hydrogen is 0 (zero) percent, the fuel cell system 1 according to the present embodiment replaces air remaining in the anode with hydrogen with the entire anode capacity. Therefore, the fuel cell system 1 according to the present embodiment can shorten the start-up time for the fuel cell 10.

If the electricity generated from the fuel cell 10 is lower in the low-temperature and short-time operation mode, the electrolyte membrane in this state is at a lower temperature and in drier condition; therefore, cross leak decreases. The fuel cell system 1 according to the present embodiment can improve fuel efficiency and shorten the start-up time because the control unit 51 sets the replacing gas amount to be lower if the electricity generated from the fuel cell 10 is lower in the low-temperature and short-time operation mode.

Figure 4A:
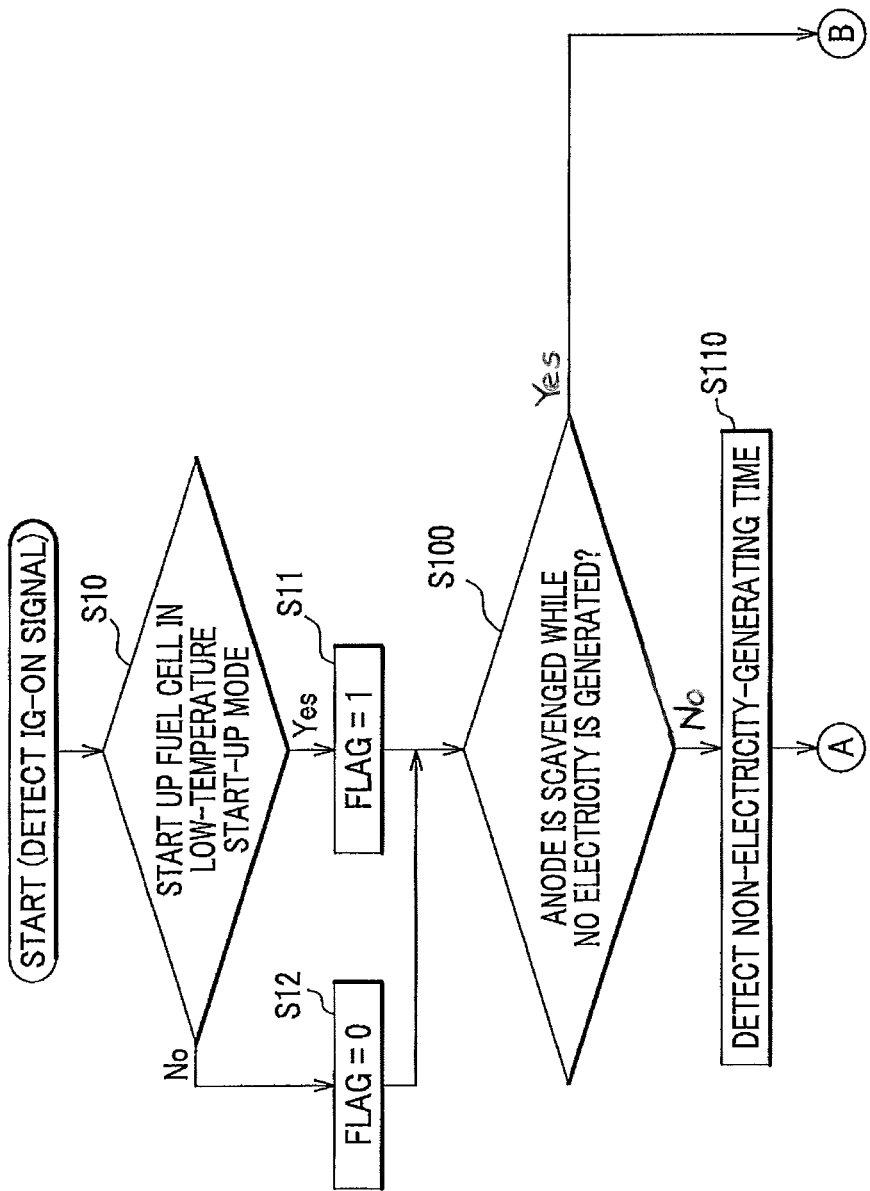
Figure 5:
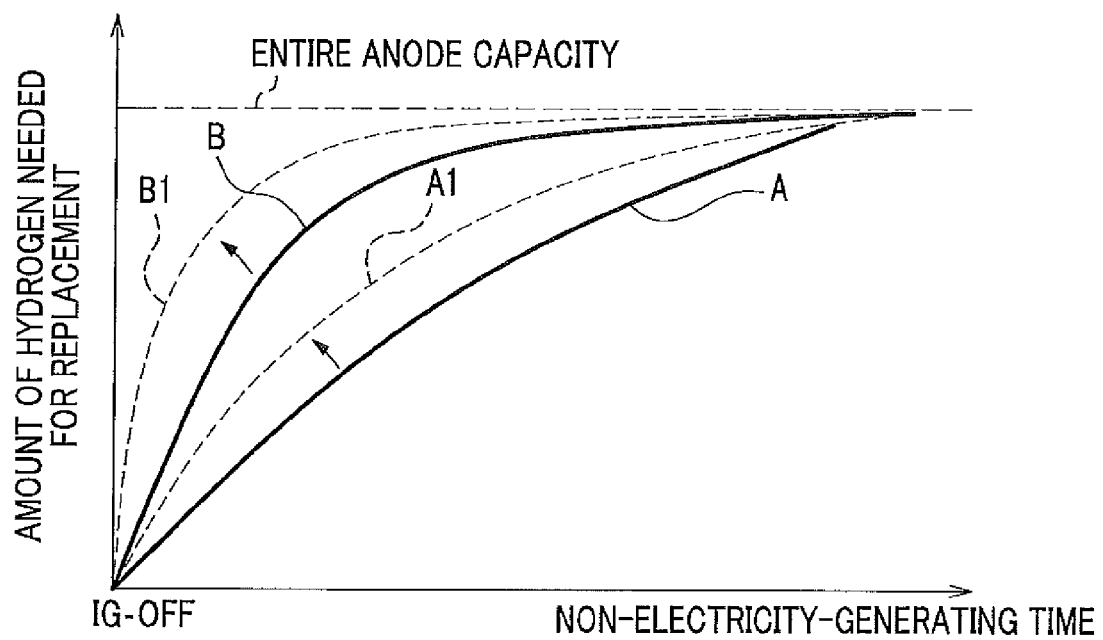
FIG. 5 shows another MAP for determining the amount of anode gas for replacing air and water remaining in the anode.

FIGS. 4A and 4B, in combination, show a flowchart showing another process of starting up the fuel cell system according to the present embodiment. FIG. 5 shows a MAP for determining the amount of anode gas for replacing air and water remaining in the anode. It should be noted that, the flowchart shown in FIGS. 4A and 4B for controlling the start-up process includes additional steps S10 to S12, S121, S122, S131, and S141 to the flowchart shown in FIG. 2. Steps identical with those of FIG. 2 are denoted by the same reference numerals shown in FIG. 2. The abovementioned explanation for the FIG. 2 will be incorporated here for their explanation applicable.

Firstly, the control unit 51 detects an IG-ON signal (start-up request signal). Then, in step S10, the control unit 51 determines whether to start up the fuel cell 10 in the low-temperature start-up mode, for example, according to the temperature in the fuel cell 10 (hereinafter called FC (fuel cell) temperature) which is detected by the temperature sensor 52 or according to ambient temperature detected by an ambient temperature sensor which is not shown in the accompanying drawings. More specifically, the control unit 51 determines to start up the fuel cell system 1 in a low-temperature start-up mode if the FC temperature or the ambient temperature is equal to or lower than a predetermined temperature (for example, 10° C.).

In the step S10, if the control unit 51 determines to start up the fuel cell 10 in the low-temperature start-up mode (Yes at the step S10), the start-up control operation proceeds to step S11, and the control unit 51 sets a flag to "1" and stores the flag in a RAM. If the control unit 51 determines not to start up the fuel cell 10 in the low-temperature start-up mode (No at the step S10), the start-up control operation proceeds to step S12, and the control unit 51 sets a flag to "0" and stores the flag in a RAM.

In the step S120, if the control unit 51 determines that the last operation of the fuel cell system 1 (vehicle) was not conducted in the low-temperature and short-time operation mode (No in the step S120), the start-up control operation proceeds to step S121, and the control unit 51 determines whether the flag was set to "1" in the RAM. When the control unit 51 accesses the RAM and determines that the stored flag indicates "1" (Yes at the step S121), the start-up control operation proceeds to step S131. In the step S131, the control unit 51 takes a fact into consideration that the fuel cell 10 was started up in the normal start-up mode previously, and then adopts a MAP for determining the replacing gas amount to be supplied to the anode of the fuel cell 10 in the low-temperature start-up mode.

The start-up control operation proceeds to step S150. In this step, the control unit 51 adopts a MAP indicated by a dashed line B1 instead of the MAP indicated by the solid line B shown in FIG. 5 to determine the replacing gas amount according to the non-electricity-generating time. As previously explained, in the low-temperature start-up mode, the control unit 51 sets the replacing gas amount to be greater than the replacing gas amount supplied in the normal start-up mode. To be more specific, the control unit 51 sets the concentration of hydrogen supplied into the anode in the low-temperature start-up mode to be higher than the concentration of replacing gas supplied in the normal start-up mode indicated by the solid line B. Therefore, the present invention can enhance warm-up capability of the fuel cell system 1.

In the step S120, if the control unit 51 determines that the fuel cell system 1 (vehicle) was previously operated in the low-temperature and short-time operation mode (Yes in the step S120), the start-up control operation proceeds to step S122, and the control unit 51 determines whether the flag was set to "1" in the RAM. If the control unit 51 accesses the RAM and determines that the stored flag indicates "1" (Yes at the step S122), the start-up control operation proceeds to step S141. In the step S141, the control unit 51 takes a fact into consideration that the fuel cell 10 was started up with the low-temperature and short-time operation in the last operation, and adopts a MAP for determining the replacing gas amount for starting up the fuel cell 10 in the low-temperature start-up mode.

The start-up control operation proceeds to step S150. In this step, the control unit 51 adopts a MAP indicated by a dashed line A1 instead of the MAP indicated by the solid line A shown in FIG. 5 and determines the replacing gas amount according to the non-electricity-generating time. As previously explained, in the low-temperature start-up mode, the control unit 51 sets the replacing gas amount (amount of hydrogen) to be greater than the replacing gas amount used in a non-low-temperature start-up mode. To be more specific, the control unit 51 sets the replacing gas amount used in the low-temperature start-up mode with reference to the MAP indicated by the dashed line A1 which shows the replacing gas amount greater than that of the solid line A. Therefore, the present invention can enhance warm-up capability of the fuel cell system 1.

In the step S121, if the control unit 51 determines that the flag was set to "0" (No at the step S121), the start-up control operation proceeds to step S130. In this step, the control unit 51 adopts the MAP indicated by the solid line B. The start-up control operation proceeds to step S150, and the control unit 51 determines the replacing gas amount according to the non-electricity-generating time. In the step S122, if the control unit 51 determines that the flag was set to "0" (No at the step S122), the start-up control operation proceeds to step S140. In this step, the control unit 51 adopts the MAP indicated by the solid line A. The start-up control operation then proceeds to step S150, and the control unit 51 determines the replacing gas amount according to the adopted MAP.

As explained above, the start-up control operation in the embodiment shown in FIGS. 4 and 5 includes additional steps for determining whether to start up the fuel cell system 1 in the low-temperature start-up mode. The present invention according to this embodiment can improve fuel efficiency and shorten the start-up time since the control unit 51 can set the replacing gas amount more appropriately when starting up the fuel cell 10.

What is claimed is:

1. A fuel cell system comprising:
a fuel cell having an anode and a cathode and producing electric power, an anode gas being supplied to the anode, a cathode gas being supplied to the cathode;
an anode gas supply unit for supplying the anode gas to the anode of the fuel cell;
an operation condition determining means for determining whether a last operation of the fuel cell system is performed in a low-temperature and short-time operation mode when receiving a start-up request signal which requests to start up the fuel cell; and
replacing means for replacing a gas remaining in the anode of the fuel cell with the anode gas supplied directly by the anode gas supply unit when starting up the fuel cell, wherein
if the operation condition determining means determines that the last operation is performed in the low-temperature and short-time operation mode, the operation condition determining means sets an amount of the anode gas, which is to replace the gas remaining in the anode of the fuel cell, to be lower than an amount of the anode gas, which is to replace the gas remaining in the anode of the fuel cell if the last operation is not performed in the low-temperature and short-time operation mode, wherein the amount of the anode gas is at a lowest level for the low-temperature and short-time operation mode.

2. The fuel cell system according to claim 1, further comprising a non-electricity-generating-time measurement unit for measuring a time period during which no electric power is being generated from the fuel cell, wherein
the operation condition determining means sets the amount of the anode gas, which is to replace the gas remaining in the anode of the fuel cell, to be greater if the non-electricity-generating time measured by the non-electricity-generating-time measurement unit is longer.

3. The fuel cell system according to claim 1, further comprising an anode-scavenging unit for scavenging the anode while no electricity is generated from the fuel cell, wherein
the operation condition determining means sets the amount of the anode gas so that the gas remaining in the anode is replaced with the anode gas with an entire anode capacity if the anode was scavenged by performing the anode-scavenging operation.

4. The fuel cell system according to claim 1, further comprising a generated-electricity calculation unit for calculating an amount of electricity generated from the fuel cell operated in the low-temperature and short-time operation mode, wherein
the operation condition determining means sets the amount of the anode gas, which is to replace the gas remaining in the anode of the fuel cell, to be lower if the generated electricity calculated by the generated-electricity calculation unit is lower.

* * * * *